Jan. 16, 1951 J. T. POTTER 2,538,122

COUNTER

Filed Nov. 13, 1943 2 Sheets-Sheet 1

Inventor

JOHN T. POTTER

By James H. Littlepage

Attorney

| | 1 L1 R1 | 2 L2 R2 | 4 L4 R4 | 8 L8 R8 | |
|---|---|---|---|---|---|
| | OX | OX | OX | OX | =0 |
| | XO | OX | OX | OX | =1 |
| | OX | XO | OX | OX | =2 |
| | XO | XO | OX | OX | 2+1=3 |
| | OX | OX | XO | OX | =4 |
| | XO | OX | XO | OX | 4+1=5 |
| | OX | XO | XO | OX | 4+2=6 |
| | XO | XO | XO | OX | 4+2+1=7 |
| | OX | OX | OX | XO | =8 |
| | XO | OX | OX | XO | 8+1=9 |
| FORCED RESET HERE → | OX | XO | OX | XO | 8+2=10 |
| | XO | XO | OX | XO | 8+2+1=11 |
| | OX | OX | XO | XO | 8+4=12 |
| | XO | OX | XO | XO | 8+4+1=13 |
| | OX | XO | XO | XO | 8+4+2=14 |
| | XO | XO | XO | XO | 8+4+2+1=15 |
| RESET TO ZERO → | OX | OX | OX | OX | |

Inventor
JOHN T. POTTER
By James H. Littlepage
Attorney

Patented Jan. 16, 1951

2,538,122

UNITED STATES PATENT OFFICE 2,538,122

COUNTER

John T. Potter, Manhasset, N. Y.

Application November 13, 1943, Serial No. 510,229

21 Claims. (Cl. 250—27)

This invention relates to electronic counters and, more particularly, to a circuit for automatically counting high frequency electric impulses.

The primary object of the invention is to provide a counter utilizing a plurality of stages of trigger circuit, each circuit having two sides which, for convenience, will be termed left and right, respectively. The arrangement of each circuit is such that, when one side is high in voltage, the other side is low, and so they stay until a pulse of one polarity is injected, whereupon the states are reversed and the originally high side becomes low, and vice versa. The stages are connected in series or cascaded relationship, and at the start of a count one side of each stage, such as the left, is high, so that the first pulse triggers the first stage and its right side then becomes high. In accordance with these objects, it is intended to connect the second stage to the first so that when a second pulse triggers the first stage back to its original state, with its left side high, a negative pulse is passed to the second stage, thereby triggering the second stage so that its right side becomes high. By similarly connecting the next succeeding stages, and by connecting an indicator to one side, such as the right, to indicate high voltage condition, a binary counter is provided wherein a high voltage condition in the right side of the first stage represents the first pulse, high voltage in the right side of the second a second pulse, high voltage in the right side of both the first and second stages equals a third pulse, ad units, ad infinitum.

By the present invention, it is proposed to provide a counter comprising one or more four-stage units, wherein the total count in the first unit represents numbers from 0 to 9 and the total of the second unit, whose first stage input is connected to the output of the fourth stage of the first unit, represents from 10 to 99. Since a four stage counter of this type would ordinarily reset on the sixteenth pulse, it is proposed now to provide a forced reset so that on the tenth pulse each stage resumes its original zero-indicating state.

It is a feature of the invention that the forced reset is obtained by supplementary impulse paths which contain no effective sources of pulse energy such as amplifier tubes. These supplementary impulse paths may therefore be characterized as passive. The supplementary impulse paths do not require the use of rectifiers or decoupling arrangements and are therefore capable of permitting impulse passage therethrough in either direction, thereby permitting the use of ordinary capacitors interconnecting certain of the stages providing a considerable advantage in simplicity over arrangements which employ additional tubes or rectifiers in the supplementary impulse paths.

Another object of the invention is to provide a reset switch and circuit so that all of the stages may simultaneously be reset to zero-indicating condition, regardless of their respective momentary conditions.

Still another object is the provision of a multistage counter embodying but one tube for each stage, thereby reducing each unit to the very minimum in size, cost, and simplicity. Furthermore, it has been found that a counter of this type may be formed with a plurality of identical plug-in units, any of which may be interchanged, replaced, or substituted without affecting the others or the system as a whole.

A more particular object is the arrangement of the circuit components so that the circuits in each unit trigger in response to pulses of one polarity only, and remain unresponsive to pulses of the opposite polarity. Yet another object is the provision of a counter wherein pulses are injected into the tube controlling the first stage, and from one stage into the tube controlling the next stage. In this embodiment, it is proposed to utilize a dual triode for each stage, each pulse being injected from the preceding stage on a common point of the two grids of the next succeeding stage, the common point being of high impedance and being connected to the grids through resistors so that positive pulses do not affect equilibrium, but negative pulses do. This injection is in contrast to prior circuits wherein rectifiers or two multi-grid tubes, such as two pentodes, were utilized.

Another object of the invention is to provide a circuit into which impulses are injected, and which varies in impedance in accordance with its momentary condition, such as its relative conductivity, whereby the circuit is not affected by the impulses when in one condition, as when at high impedance, but whereby it is affected by the impulses when at another condition as at low impedance. It is intended to apply this concept particularly with reference to an automatic reset circuit, and to utilize a variation of the principle to achieve direct injection of actuating impulses to both sides of a trigger stage.

These and other objects will appear from the following specification and drawings, in which:

Fig. 1 is a circuit diagram of the preferred embodiment of the invention;

Figure 3:
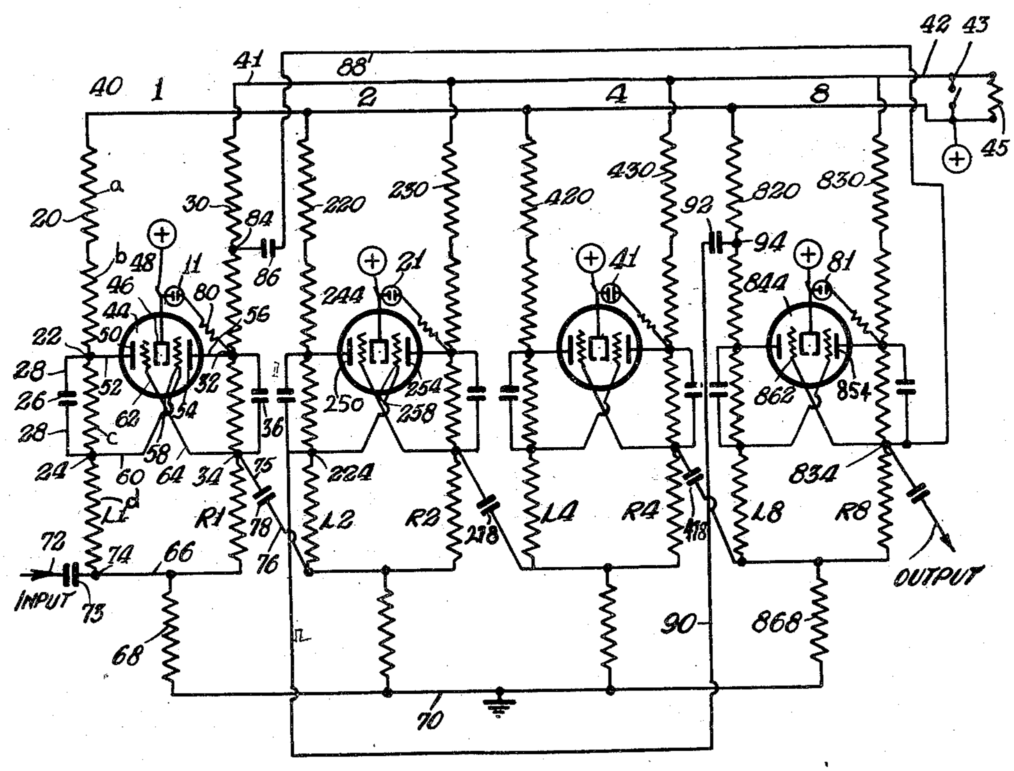
Fig. 3 is a chart showing the relative voltage conditions of each stage throughout the cycles of operation.

Referring now to the drawings, in which like reference numerals denote the same or analogous elements, Fig. 1 shows a four stage counter in which the stages are respectively designated 1, 2, 4, 8 in representation of their corresponding functions in the counting cycle. The stages are substantially identical except for the reset circuits, hence stage 1 will be detailed with the understanding that the succeeding stages differ only where specifically designated.

In stage 1, the left-hand side L1 of the circuit includes a voltage divider 20 having taps 22 and 24 spaced therealong, between which taps a condenser 26 is connected as at 28. The right-hand side R1 is also composed of a voltage divider 30 with taps 32 and 34 and a condenser 36 shunted therebetween. A plate voltage supply line 40 is connected to voltage divider 20 of stage 1, as well as to the corresponding dividers 220, 420, and 820 in stages 2, 4, and 8, while another plate voltage supply line 41 is common to voltage dividers 30, 230, 430, and 830, plate voltage supply 41 being connected at 42 to the positive side of the plate switch which, for the values later given, is +500 volts. A normally closed reset switch 43 and resistor 45 shunting the switch is provided for connecting lines 40 and 41 and for disconnecting them to reset the circuits as later detailed.

A single tube, a dual triode is used for each stage, the tube 44 having its cathode 46 connected to positive voltage, such as +250 volts, which is less than the positive voltage supplied to the cathodes at 48. Plate 50 of the left-hand section is connected by plate lead 52 to voltage divider 20 at tap 22 and, correspondingly, plate 54 is connected by plate lead 56 to tap 32 of voltage divider 30. It should be noted particularly that grid 58 of the right-hand section of dual triode 44 is cross-connected by lead 60 to tap 24 of voltage divider 20 on the left side L1, and that grid 62 is also crossed over by lead 64 to tap 34 of voltage divider 30 on the opposite side R1, these grids being connected together through the resistances forming the lower sections of dividers 20 and 30 and through a common connection 66. In each stage the common grid connection is connected through a resistor 68 to ground line 70 corresponding to the negative side of the power supply.

The operation of a single stage is as follows: Because of the cross-connected grids, one side only of the dual triode will pass current at any given time and, considering stage 1 for example, when plate 54 of side R1 is low in voltage, grid 62 on the left-hand side of the tube is biased less positive and blocks current flow so that plate 50 is high in voltage. When plate 50 is at high voltage, grid 58 cross connected to side L1 is in positive, non-blocking condition. At the start of a counting operation, reset switch 43 is momentarily opened, thus connecting side R1 to the positive side of the plate power supply through resistor 45 and thereby arbitrarily rendering plate 54 low, grid 62 low, plate 50 high, and grid 62 high. Thus when switch 43 is closed to short circuit resistor 45, side R1 stays low in voltage and lamp 11 is now off. This action occurs in each stage so that upon closing of switch 43, sides L1, L2, L4, and L8 are at high voltage and sides R1, R2, R4, and R8 are low in voltage as indicated in the "0" row in the Fig. 3 table.

A neon lamp 11 is connected to cathode 46 and to plate lead 56 through a resistor 80 so that when plate 54 is high in voltage, the lamp illuminates and when the plate voltage drops, the lamp is off. Lamps 21, 41, and 81 are similarly connected in the succeeding stage so that an indication of the voltage condition of each stage is obtained.

Upon closing of reset switch 43, the stages show in Fig. 1 are maintained at equilibrium with typical voltages as follows: Plate 50, +400 volts; grid 58, +252 volts; plate 54, +290 volts; grid 62, +220 volts and cathode 48, +250 volts. These are the approximate relative voltages, assuming the values in dividers 20 and 30 to be 20,000 ohms, 2 watts, for the *a* and *b* sections; 100,000 ohms, 1 watt for the *c* section; 60,000 ohms, 1 watt for the *d* section; resistor 68, 100,000 ohms, 1 watt; resister 80, 0.5 megohm; condensers 26 and 36, 150 micromicrofarads; condenser 73, 150 micromicrofarads (for 100 kilocycles); condensers 78, 278, 478, and 878, 500 micromicrofarads; and condenser 86 and 92, 50 micromicrofarads. When a positive pulse is injected at point 74 through condenser 73 of input 72, the positive voltage is supplied similarly to both grids 58 and 62. Grid 58, being already positive, draws grid current holding down the potential rise and the positive voltage applied to grid 62 is insufficient to drive it more positive. However, when a negative pulse is injected, both ends of the input network are at high impedance since no grid current flows; the negative pulse momentarily biases grid 58 in a negative direction, thus cutting off the flow of current of plate 54 so that it suddenly rises to +400 volts. Upon cessation of the negative input pulse, the positive pulse generated by the sudden rise of plate 54 from +290 volts to +400 volts is conducted through condenser 36 to bias grid 62 more positive so that plate current now flows in the left-hand triode section, plate 50 then being low in voltage, plate 54 high, the voltage relationship of each side of the stage are reversed, and neon lamp 11 illuminated. The second negative pulse will reverse the relationships back to the starting condition.

It should be noted particularly that the input to each stage is injected at a point, at the lower ends of dividers 20 and 30 for stage 1, common to both grids 58 and 62. However, it appears that the grid most positive dissipates more of the energy of a positive impulse so that the voltage rise in the opposite grid becomes less than if both grids were at high impedance. However, both grids are subject to being biased in a negative direction by a negative impulse more than by a positive pulse of the same amplitude. This principle becomes evident upon considering stage 1 of Fig. 1, in the case where side L1 is at relatively high voltage and R1 at low voltage, with grid current flowing in grid 58 and with no grid current flowing in grid 62. A large portion of the energy of a positive pulse is dissipated through grid 58 so that grid 62 does not receive enough of the positive energy of the pulse to be greatly affected. However, since grid 62 is negative, it and divider 30 are at high impedance to relatively negative impulses so that the greater portion of the energy of a negative impulse is imposed upon grid 58, thereby biasing it also to cut-off. By this arrangement, the actuating impulses may be injected directly to the same grids used for triggering.

The stages are connected in series or cascaded relationship as, in the Fig. 1 example, by an impulse path comprising an output lead 75 connected at tap 34 and through a condenser 78 to become the input 76 of stage 2, the succeeding stages being correspondingly connected. As previously detailed, the stages are unaffected by positive pulses uniformly or symmetrically injected at a point common to both sides so that the sudden rise in positive voltages at tap 34 does not trigger stage 2, but when the second pulse returns stage 1 to its starting condition, a sudden negative voltage appears at tap 34, and stage 2 is thereby reversed, and lamp 21 goes on to denote the second pulse. The relative voltage conditions of the respective sides of each circuit are shown in Fig. 3, wherein O=high voltage, and X=low voltage. The neon lamp for any given stage is illuminated when the right-hand side R1, R2, R4, or R8 is at high voltage, and the total number of negative input impulses may be ascertained by adding the numbers represented by the stages. For example, after seven negative input pulses, lamp 11, 21, and 41 of stages 1, 2, and 4 will be on, on the eighth pulse, lamp 81 alone is illuminated, and an the ninth pulse, lamps 11 and 81 are lit.

Natural reset of the normal completion of the counting cycle at the circuit would occur with the 16th pulse. However, to convert the counter to the desired decimal system, coupling and feedback reset circuits are provided to force a premature or modified reset to zero on the tenth negative pulse. After the ninth pulse, the voltage conditions of the stages are as follows:

| 1 | | 2 | | 3 | | 4 | |
|---|---|---|---|---|---|---|---|
| L1 | R1 | L2 | R2 | L4 | R4 | L8 | R8 |
| X | O | O | X | O | X | X | O |

Stage 1 will naturally reverse with the tenth pulse. To reverse stage 8 also on the tenth pulse and out of its natural sequence, a coupling circuit or supplementary impulse path is connected at tap 84 in voltage divider 30 of side R1, stage 1, the circuit being connected through condenser 86 and lead 88 to tap 834 of side R8 stage 8 so that when stage 1 reverses and side R1 drops in voltage, a pulse in the negative direction biases grid 862 of tube 844 negative, thus reversing stage 8. It should be noted that, while pulses were previously injected into stage 8, stage 8 is capable of being reversed through the supplementary impulse path comprising circuit 88 only by a negative pulse on grid 862 on or after the ninth count only, because until the eighth negative impulse, plate 854 was low in voltage, plate current was flowing on side R8, and grid 862 was low with no grid current flowing. The main energy of the positive impulses was dissipated through plate 854 and insufficient energy remained in the positive pulses to affect grid 862. Since only approximately a 50 volt swing was transmitted through line 88, the voltage drop was insufficient to unbalance the circuit as applied to plate 854, and grid 862 was at low cut-off voltage already. On the eighth count, the negative pulse from stage 4 predominates in stage 8. When the ninth negative pulse was injected into stage 1, plate 854 and grid 862 were at high voltage, and the pulse in the positive direction transmitted from tap 84 through line 88 was dissipated through grid 862 in which grid current was then flowing. However, the tenth actuating impulse injected into stage 1 triggers it so that side R1 drops in voltage, and the voltage drop at tap 84 injects an impulse in the negative direction at tap 834 of stage 8, at which instant the impedance of plate 854 was high since plate current was not flowing therein. Thus, the major portion of the energy of the pulse in the negative direction was imposed upon grid 862, thus impressing on it the major effect of the 50 volt voltage drop to achieve cut off in the left-hand section of tube 844. Stage 8 is thereby triggered back to its starting condition only by the 10th actuating impulse supplied to input of stage 1.

To prevent lamp 21 of stage 2 from going on with the tenth pulse, a feedback or supplementary impulse path comprising circuit 90, including condenser 92 is led from tap 94 of voltage divider 820 of stage 8 back to tap 224 of divider 220 of stage 2 so that, when stage 8 resets and side L8 of the network suddenly rises in voltage, a strong pulse in the positive direction is fed back to grid 258 of tube 244, thereby ensuring that current will flow in the right-hand section of tube 244. By connecting the feedback or supplementary impulse circuit 90 so that the side of stage 8 is connected to that side of stage 2 which corresponds in function thereto, stage 2 will not be affected when stage 8 reverses on the 8th count.

Figures 2, 3:
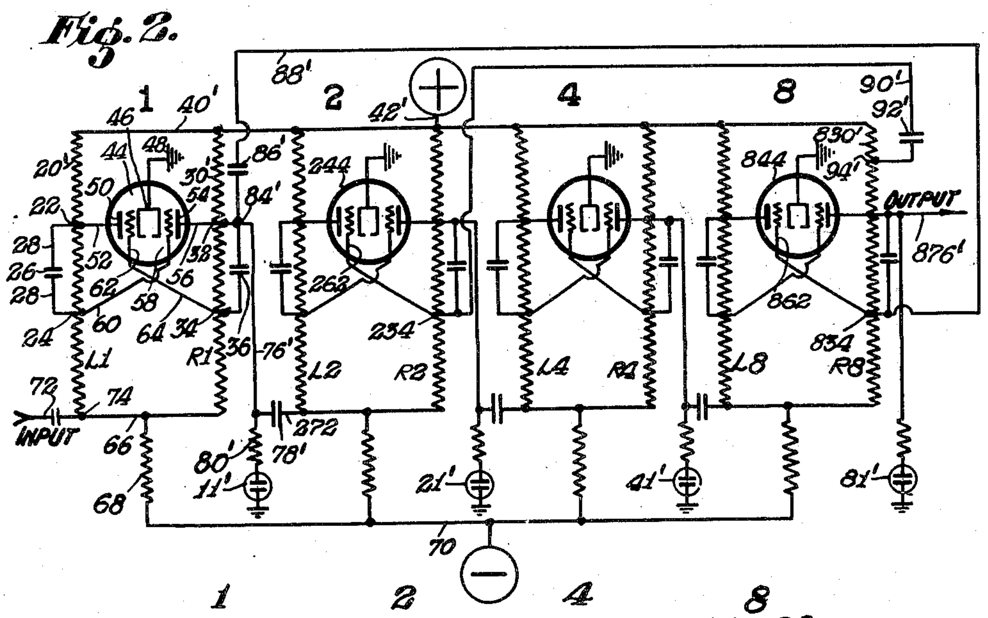
Fig. 2 is a circuit diagram of a second embodiment of the invention.

A second embodiment of the basic concept of the invention is illustrated in Fig. 2, wherein elements substantially similar to those above described are designated by similar reference numerals and elements analogous to those in Fig. 1 are given corresponding numbers. Obviously, the specific values of the elements may vary in accordance with the circuit requirements.

In Fig. 2, the left-hand side L1 of the circuit of stage 1 includes a voltage divider 20′ having taps 22 and 24 spaced therealong, between which taps a condenser 26 is connected by shunt 28. The right-hand side R1 is similarly composed of a voltage divider 30′ having taps 32 and 34 with a condenser 36 connected therebetween, and plate supply line 40′ common to each side of all the stages is connected at 42 to the positive side of a suitable power supply, which may be of 300 volts in this example.

A dual triode is used for each stage, the tube 44 having its cathode 46 connected to ground at 48. The plate 50 of the left-hand section connected by plate lead 52 to voltage divider 20′ at tap 22 and likewise, plate 54 of the right-hand section is connected by plate lead 56 to tap 32 of voltage divider 30′. As in the previous example, grid 58 of the right-hand section of dual triode 44 is cross-connected by lead 60 to tap 24 of the voltage divider 20′ on side L1, and grid 62 is also cross-connected by lead 64 to tap 34 of the voltage divider 30′ on side R1, these grids being connected together through the resistances in the lower sections of the voltage dividers 20′ and 30′, and through common line 66. Line 66, in each stage, is connected through a resistance 68 to the negative plate power supply line 70 which is at −300 volts.

It will thus be seen that the supplementary impulse paths comprising circuits 88 and 90 comprise no additional vacuum tubes and are therefore passive. Moreover they include as circuit elements only the condensers 86 and 92 respectively, there being no need to provide rectifiers or decoupling devices. These impulse paths, may therefore take any simplified form which passes impulses indiscriminately in both directions.

The essential operation of a single stage in the Fig. 2 circuit is substantially similar to that previously described, with the following differences in voltages: With input plate voltages at 300 volts, the voltage in plate load line 40' stays at +300 volts and the voltage in line 66 remains −100 volts because of resistor 68. Also, in this phase, the voltage at tap 22 would be +150 volts, at tap 24, +2 volts, which of course holds grid 58 at +2 volts, whereas in the right side R1, the voltage at tap 32 would be +50 volts and at tap 34, −30 volts so that grid 62 is also at −30 volts. When a negative pulse is injected at 72, both ends of the input network are at high impedance, and the negative pulse appearing at grids 58 and 62 is sufficient to cause triggering because of the relationship of the values of condensers 26 and 36 to the time constant of the incoming pulse.

A negative pulse impressed on grids 58 and 62 momentarily biases grid 58, formerly at +2 volts, negative, thus cutting off the flow of plate current for plate 54, thereby suddenly raising its plate voltage to +150 volts and, in turn, charging condenser 36. The negative pulse has a smaller time constant than condenser 36 and its associated resistor sections of voltage divider 30' so that when the negative pulse ceases, the positive pulse generated by the sudden rise of the voltage of plate 54 from +50 to +150 volts is conducted through condenser 36 and lead 64 to grid 62 to bias it positive from its former −30 volts, thereby unblocking the left-hand section of the tube and reversing the various voltage relationships so that grid 58 becomes negative at −30 volts and the circuit of plate 54 surges to +150 volts.

The first triggering of stage 1 and the resultant rise in the voltage of side R1 effects a concurrent sudden rise in the voltage of output 76' connected at tap 32 and, through condenser 78', the positive pulse is injected through input 272 to stage 2. In this example, higher voltages occur in the output, but condenser 78 must be smaller than condenser 78' in the Fig. 1 modification and hence more critical. This increased voltage of side R1 is effective to light neon lamp 11' connected to ground, and connected through resistor 80' to output 76, thereby to indicate that one negative pulse has been injected at 72. When the second negative pulse is injected, stage 1 returns to its original state with side R1 low in voltage and lamp 11' out. However, in returning to its original state, stage 1 passes through output 76 a pulse in the negative direction so as to trigger stage 2 and light lamp 21'. A third pulse triggers stage 1 so that side R1 rises in voltage and lamp 11' goes on, but stage 2, being unaffected by the positive rise of voltage in output 76, remains with its side R2 high in voltage. The fourth pulse returns stage 1 to its original state, the return causing a negative pulse to be passed along to stage 2 which, in turn, passes along a negative pulse to trigger stage 4 so that lamps 11' and 21' are off, but lamp 41' lights when side R4 of stage 4 goes high in voltage.

So as to return stage 8 to its initial stage while holding stages 2 and 4 as they stood before the tenth negative pulse, a portion of the output of stage 1 is derived at 84' and injected, through condenser 86' and lead 88', into stage 8 at tap 834 so that by the tenth pulse, which triggers R1 to low voltage, a voltage of negative excursion is injected on grid 862 of tube 844 in stage 8, thus returning side R8 to the high voltage state there maintained during pulses 1 to 7, inclusive.

On the tenth pulse, with which stage 1 would ordinarily trigger stage 2 so that side R2 would swing to high voltage, a pulse is passed back, through lead 90', which is connected through condenser 92' to tap 94' in voltage divider 830'. The pulse resulting from the excursion towards the negative of side R8 when stage 8 is reset is injected at tap 234 on to grid 262 of tube 240 to counteract the pulse injected from stage 1 so that stage 2 maintains normally with side R2 low in voltage.

In each example, a second unit may be connected to output 876 or 876', in which case a negative pulse would be passed to the first stage of the second unit upon each resetting of stage 8.

In the above specification, reference numerals have been applied to stage 1 but omitted from some of the similar components of stages 2, 4, and 8, it being manifest that the stages are identical except where specifically differentiated, as in the reset circuits. Likewise, the negative pulses have been described as injected to the grids of dual triodes although, conceivably, equivalent modes of injection might be employed.

Specific values are set forth by way of example and to help those skilled in the art to reproduce the invention. The theories of operation are submitted as the apparent explanation of the phenomena without limitation.

I claim:

1. In combination, a pair of vacuum tube means each comprising an anode, a control grid, and cathode means, means for applying a positive potential to the anodes, means for applying a relatively negative potential to the cathode means, a resistance network for each tube means, anode and grid connections in said network whereby the anode of each tube means is connected through a resistance to the control grid of the other tube means, a pair of condensers respectively connected between said anode and grid connections and shunting said resistances, each of said networks including a further resistance each having one end connected to said grid connections, said further resistances having their other ends connected together, an input circuit connected to said other ends, an additional resistance, and means for applying a source of potential negative with respect to said positive potential connected through said additional resistance to said other ends of said further resistances.

2. The combination claimed in claim 1, and a second input connected into one of said networks at the grid connection thereof.

3. The combination claimed in claim 1, and an output connected to one of said networks at the grid connection thereof.

4. The combination claimed in claim 1, one of said resistance networks including resistor means connected between the plate connection thereof and the positive anode potential applying means, said resistor means having a terminal intermediate its ends, and an output connected to said terminal.

5. In the combination claimed in claim 1, an output circuit connected to one of said networks at the grid connection thereof, the last mentioned network including resistor means connected between the plate connection thereof and the positive anode potential applying means, said resistor means having a terminal intermediate its ends, and a second output circuit connected to said terminal.

6. In the combination claimed in claim 1, an output circuit connected to one of said networks at the grid connection thereof, and a second input circuit connected to the other of said networks at the grid connection thereof.

7. A four stage counter, each of said stages comprising a dual triode having two sections, common cathode means, and a plate and grid in each section, a pair of voltage dividers connected in parallel and thus forming opposite sides of a resistance network and having a pair of spaced intermediate taps with one of said taps in each divider being connected to a plate in one section and the other of said taps being connected to the grid in the opposite section and a condenser shunted between said spaced taps, plate power means having one side thereof connected to corresponding ends of said dividers, means for connecting the other side of said plate power means to the other ends of said dividers, each of said sections having input means for supplying input actuating impulses uniformly to both sides of the network thereof for reversing the voltage relationships of said sides upon input thereto of actuating impulses and output means connected to one of the sides thereof for transmitting actuating impulses for every second actuating impulse input thereto, means including a condenser for connecting the respective outputs and inputs of adjacent stages to form a series of stages, and a coupling circuit connected between the output side of the first stage and the output side of the fourth stage, whereby to reverse the fourth stage upon input of the tenth actuating impulse to the first stage.

8. In a trigger circuit comprising space discharge devices, means including electrodes providing a pair of anodes, a pair of control grids and cathode means and having two distinct predetermined conditions of stability each characterized by greater current flow to one of the anodes of the pair than to the other, an end pair of resistors, each adapted to energize one of the anodes from a source of positive potential, a central pair of resistors each providing a current path from one of the anodes to the control grid associated with the other anode of the pair, a pair of capacitors each connected in parallel with one of the last-named resistors for reducing the pulse-impedance of the current path formed by each such parallel combination, a second end pair of resistors each adapted to energize one of the control grids from a source of negative potential, means adapted to maintain the cathode means at a potential intermediate the potentials of the positive and negative sources, common impedance means providing direct current continuity included in the path between the second end pair of resistors and the point where it is adapted to be energized by a source of negative potential, and circuit means including the impedance means and adapted to permit the application of an impulse of predetermined polarity symmetrically to the second end pair of resistors for producing a substantially instantaneous shift from either of the two conditions of stability to the other.

9. A circuit as in claim 8 in which the common impedance means is a resistor.

10. A circuit as in claim 8 further comprising a current reducing means operatively associated with one of the anodes of the pair, and switching means in the anode energization circuit operable to render the current reducing means effective to reduce the energization of the one anode to a degree at least sufficient to establish in the trigger circuit a predetermined one of the two distinct conditions of stability.

11. A circuit as in claim 8 in which the common impedance means is a resistor, and further comprising a current reducing means operatively associated with one of the anodes of the pair, and switching means in the anode energization circuit operable to render the current reducing means effective to reduce the energization of the anode to a degree at least sufficient to establish in the trigger circuit a predetermined one of the two conditions of stability.

12. In an electrical circuit, a plurality of electronic means disposed in cascade relationship, each such means comprising a plurality of electrodes providing a pair of anodes, a pair of control grids and cathode means and having two distinct predetermined conditions of stability each characterized by greater current flow to one of the anodes of the pair than to the other, an end pair of resistors, each adapted to energize one of the anodes from a source of positive potential, a central pair of resistors each providing a current path from one of the anodes to the control grid associated with the other anode of the pair, a pair of capacitors each connected in parallel with one of the last-named resistors for reducing the pulse-impedance of the current path formed by each such parallel combination, a second end pair of resistors each adapted to energize one of the control grids from a source of negative potential, means adapted to maintain the cathode means at a substantially fixed potential intermediate the potential of the positive and negative sources, common impedance means providing direct current continuity included in the path between one of the end pairs of resistors and the point where it is adapted to be energized by a source of potential, a first circuit means adapted to permit the application of a pulse of predetermined polarity symmetrically with respect to an end pair of resistors for producing a substantially instantaneous shift from either of the two conditions of stability to the other, a second circuit means interconnecting two electronic means of the cascade arrangement and disposed to produce a shift in one of the electronic means which would not otherwise normally occur therein by reason of the cascade relationship among the plurality of electronic means, and a third circuit means interconnecting the last-named electronic means and another electronic means of the cascade arrangement and disposed to prevent a shift in the other electronic means which would otherwise normally occur therein by reason of the cascade relationship among the plurality of electronic means, the preventive action being effective in response to the occurrence of a shift produced by the second circuit means.

13. A circuit as in claim 12 in which the common impedance means is a resistor.

14. A circuit as in claim 12 further comprising a current reducing means operatively associated with one of the anodes of the pair, and switching means in the anode energization circuit operable to render the current reducing means effective to reduce the energization of the one anode to a degree at least sufficient to establish in the trigger circuit a predetermined one of the two distinct conditions of stability.

15. A circuit as in claim 12 in which the common impedance means is a resistor, and further comprising a current reducing means operatively associated with one of the anodes of the pair, and switching means in the anode energization circuit operable to render the current reducing means effective to reduce the energization of the anode to a degree at least sufficient to establish in the trigger circuit a predetermined one of the two conditions of stability.

16. In an electrical circuit capable of counting ten impulses from zero to nine, a cascaded series of four trigger circuits each having two conditions of stability, each trigger circuit being first actuated and then restored by successive impulses applied thereto, a first supplementary impulse path interconnecting the first and fourth trigger circuits arranged, after actuation of the fourth trigger circuit in response to the eighth pulse, to restore the fourth trigger circuit in response to the tenth actuation of the first trigger circuit, and a second supplementary impulse path interconnecting the fourth and second trigger circuits arranged to prevent actuation of the second trigger circuit upon restoration of the fourth.

17. A circuit as in claim 16 in which one of the supplementary impulse paths is passive.

18. A circuit as in claim 16 in which one of the supplementary impulse paths is passive and directly interconnects the respective trigger circuits.

19. In an electrical circuit responsive to successive impulses, a series of trigger circuits, each having an initial condition of stability and an actuated condition of stability and each having a connection to the following trigger circuit, a first circuit means for applying impulses to the first trigger circuit, a second circuit means interconnecting two of the trigger circuits and disposed to cause triggering of one of the circuits which would otherwise not normally occur as a result of the series relationship, said second circuit means being effective to restore said one trigger circuit to its initial condition of stability but being ineffective to actuate said circuit to its actuated condition of stability, a third circuit means interconnecting the last named trigger circuit and another of the trigger circuits disposed to prevent triggering of the other trigger circuit which would otherwise normally occur by reason of the series relationship.

20. In an electrical circuit capable of counting ten impulses from zero to nine, a series of four trigger circuits each having an initial condition of stability and an actuated condition of stability and each having a connection to the following trigger circuit, a first circuit means for applying impulses to the first trigger circuit, a first supplementary impulse path interconnecting the first and fourth trigger circuits arranged, after actuation of the fourth trigger circuit in response to the eighth input impulse to the first trigger circuit, to restore the fourth trigger circuit in response to the tenth input impulse to said first trigger circuit, and a second supplementary impulse path interconnecting the fourth and second trigger circuits arranged to prevent actuation of the second trigger circuit in response to the tenth input impulse to the first trigger circuit.

21. In an electrical circuit responsive to successive impulses, a series of trigger circuits each having an initial condition of stability and an actuated condition of stability, and each having a connection to the following trigger circuit each trigger circuit comprising a pair of tubes and a pair of networks interconnected with said tubes, one of said tubes in said initial condition of stability being conductive and the other non-conductive and the conductivities of said tubes being interchanged in said actuated condition of stability, a passive coupling from the network connected to the plate of the initially conductive tube of a lower stage to the corresponding network of the last stage; and a second coupling from one of said networks of the last stage to the corresponding network of an intermediate stage, whereby in response to an input impulse to the first stage following a predetermined number of such impulses normal operation of the said intermediate stage is prevented and the last stage is restored to initial condition.

JOHN T. POTTER.

REFERENCES CITED

The following references are of record in the file of this patent:

UNITED STATES PATENTS

| Number | Name | Date |
|---|---|---|
| 2,158,285 | Koch | May 16, 1939 |
| 2,272,070 | Reeves | Feb. 3, 1942 |
| 2,289,987 | Norton | July 14, 1942 |
| 2,306,386 | Hollywood | Dec. 29, 1942 |
| 2,310,105 | Michel | Feb. 2, 1943 |
| 2,342,753 | Pearson et al. | Feb. 29, 1944 |
| 2,348,016 | Michel | May 2, 1944 |
| 2,404,047 | Flory et al. | July 16, 1946 |
| 2,410,156 | Flory | Oct. 29, 1946 |

OTHER REFERENCES

An article entitled "A Vacuum Tube Circuit for Scaling Down Counting Rates" by Stevenson & Getting appearing on pages 414, 415 and 416 of Review of Scientific Instruments of Nov. 1937.

Physical Review, vol. 57, Feb. 1940, "New Vacuum Tube Scaling Circuits" by Lifschutz, pages 243 and 244.

Review of Scientific Instruments, vol. 12, Feb. 1941, "Vacuum Tube Scaling Circuit" by De Vault, pages 83–85.

Electronics, "Trigger Circuits" by H. J. Reich, pages 14 to 17, August 1939.

Certificate of Correction

Patent No. 2,538,122 January 16, 1951

JOHN T. POTTER

It is hereby certified that error appears in the printed specification of the above numbered patent requiring correction as follows:

Column 11, line 17, for the word "tenth" read *next*;

and that the said Letters Patent should be read as corrected above, so that the same may conform to the record of the case in the Patent Office.

Signed and sealed this 29th day of May, A. D. 1951.

[SEAL]

THOMAS F. MURPHY,
*Assistant Commissioner of Patents.*